United States Patent [19]

Borden et al.

[11] 3,943,103

[45] Mar. 9, 1976

[54] RADIATION CURABLE COMPOSITIONS OF VINYL ACETATE POLYMERS

[75] Inventors: George Wayne Borden, Niantic, Conn.; Charles Hobert Carder, Charleston, W. Va.

[73] Assignee: Union Carbide Corporation, New York, N.Y.

[22] Filed: Apr. 9, 1974

[21] Appl. No.: 459,294

[52] U.S. Cl. ...... 260/47 UA; 204/159.22; 260/63 R; 260/63 HA; 260/73 R; 260/80.7; 260/80.72; 260/80.73; 260/80.75; 260/80.76; 260/80.8; 260/85.7; 260/85.5 ES; 260/86.1 R; 260/86.1 E; 260/87.1; 260/87.3; 428/462; 428/463; 428/52.2
[51] Int. Cl.$^2$ ........................................ C08F 218/08
[58] Field of Search ......... 260/47 UA, 85.7, 86.1 E, 260/86.1 R, 90.1, 87.1, 87.3, 85.5 ES, 63 R, 73 R, 80.7, 80.72, 80.73, 80.75, 80.76, 80.8, 63 HA; 204/159.22

[56] References Cited
UNITED STATES PATENTS

| | | | |
|---|---|---|---|
| 3,083,172 | 3/1963 | Scott et al. | 260/29.6 |
| 3,275,589 | 9/1966 | Alexander et al. | 260/29.6 |
| 3,751,399 | 8/1973 | Lee, Jr. et al. | 260/47 |

*Primary Examiner*—Lester L. Lee
*Attorney, Agent, or Firm*—Francis M. Fazio

[57] ABSTRACT

The dissolution of certain low molecular weight vinyl resins in radiation curable compositions of one or more polyfunctional polymerizable reactive solvent and, optionally, one or more monofunctional reactive solvent yields compositions having better adhesion to metals than is obtained with the same composition without the vinyl resins and with better stain and abrasion resistance than could be obtained with the vinyl resins alone. The low molecular weight vinyl polymer is preferably a vinyl acetate polymer having an inherent viscosity below about 0.25 and a glass transition temperature from about 25°C. to about 55°C.

23 Claims, No Drawings

RADIATION CURABLE COMPOSITIONS OF VINYL ACETATE POLYMERS

BACKGROUND OF THE INVENTION

Ever-increasing restrictions on the amounts and types of volatiles permitted to escape into the atmosphere from coating and ink compositions have prompted considerable efforts to develop liquid compositions having a minimal amount of volatile components. These improved compositions contain reactive chemicals as solvents which undergo reaction and become incorporated into the cured composition. In the majority of cases the cure is by the free radical addition polymerization of the composition directly on the substrate. Often, the polymerization is conveniently initiated by exposure of the applied composition to high energy radiation such as electron beam radiation or to actinic light radiation such as ultraviolet light radiation.

These compositions contain one or more monofunctional or polyfunctional monomers and in many instances the inclusion of a higher molecular weight component, such as a reactive oligomer, has been found useful. The incorporation of non-reactive polymers as film formers is also known and many attempts have been made to include the known commercially available vinyl resins in such compositions. However, the use of such high molecular weight vinyl resins in radiation curable coatings has not gained wide acceptance because of the difficulty of getting them into solution and the consequent high viscosities of the solutions of such compositions containing the reactive solvent and the high molecular weight vinyl resin. The use of vinyl resins in such compositions is particularly desirable because of their known excellent film-forming properties.

SUMMARY OF THE INVENTION

Compositions containing one or more of certain reactive solvents and certain low molecular weight vinyl resins having an inherent viscosity of below about 0.25 are useful as coatings and inks that can be cured by radiation. These compositions have acceptable viscosity for ease of application and the cured compositions have improved adhesion and flexibility, and improved abrasion and stain resistance.

DESCRIPTION OF THE INVENTION

The low viscosity radiation curable compositions of this invention are produced by the addition of certain low molecular weight vinyl resins to one or more functional reactive solvents. It was a completely unexpected and unobvious finding that such compositions cured to yield coatings and inks having the excellent properties that they possess since previous experience with vinyl resins in coating and ink compositions had indicated that their properties were improved by increasing the molecular weight of the vinyl resin added thereto. Hence, the discovery that the addition of a low molecular weight vinyl resin rather than a higher molecular weight vinyl resin resulted in compositions that possessed improved adhesion and flexibility, and improved abrasion and stain resistance properties was a completely unexpected and unobvious finding.

The compositions of this invention contain the functional reactive solvent medium and the low molecular weight vinyl resins hereinafter defined. Photoinitiators can also be present in the composition when the composition is to be cured by light radiation. In addition, pigments and other additives such as flow control agents, fungicides, antistats, or any of the other additives normally present in such compositions can be added. The types and amounts thereof are well known to those skilled in the art and do not require further elaboration herein since any of the conventional materials can be used in the conventionally employed quantities.

The low molecular weight vinyl resins that are used in the curable compositions of this invention are those vinyl acetate polymers containing from 5 to 100 mole percent vinyl acetate therein, preferably at least about 35 mole percent vinyl acetate; have an inherent viscosity below about 0.25, preferably from 0.05 to 0.15 measured at 30°C. using a solution of 0.2 gram of resin per 100 ml. of cyclohexanone and have a glass transition temperature above about room temperature preferably from about 25°C. to about 55°C. Included are poly(vinyl acetate), copolymers of vinyl acetate with vinyl chloride, and polymers of vinyl acetate and vinyl chloride with one or more other polymerizable comonomers present in minor molar amounts, wherein the vinyl acetate content is as set forth above.

Any of the known polymerizable ethylenically unsaturated monomers containing the polymerizable

group can be used as the other polymerizable comonomer that is optionally present in the vinyl acetate polymer and illustrative thereof one can mention ethylene, styrene, acrylic acid, methacrylic acid, maleic acid, acrylamide, methyl acrylate, ethyl acrylate, glycidyl acrylate, 2-ethylhexyl acrylate, butoxyethyl acrylate, 2-hydroxypropyl acrylate, acrylonitrile, methacrylonitrile, butadiene, vinylidene chloride, vinyl butyrate, vinyl butyral, vinyl methyl ketone, acrolein, methacrolein, vinyl ethyl ether, vinyl ethyl sulfone, vinyl pyridine, or any of the methacrylates of the previously identified acrylate compounds. The specific compounds herein mentioned are merely illustrative and are not to be considered allinclusive; those skilled in the art are fully familiar with the known polymerizable ethylenically unsaturated comonomers. Preferably the other comonomer is present at a concentration below about 25 mole percent.

The functional reactive solvents can be monofunctional or polyfunctional. A single polyfunctional reactive solvent can be used or a mixture of two or more; or a combination of one or more monofunctional reactive solvents and one or more polyfunctional reactive solvents can be used. The latter mixtures are generally more desirable.

The monofunctional reactive solvent can be any polymerizable ethylenically unsaturated monomer containing a single

group which together with the herein defined low molecular weight vinyl resin and polyfunctional reactive solvent produces a composition that is liquid at room temperature and which is curable to a solid upon exposure to radiation. Illustrative thereof one can mention styrene, methyl methacrylate, butyl acrylate, isobutyl acrylate, 2-ethylhexyl acrylate, 2-hydroxyethyl acrylate, dicyclopentenyl acrylate, (methylcarbamyl)ethyl acrylate, 2-phenoxyethyl acrylate, 2-methoxyethyl acrylate, 2-(N,N-diethylamino)-ethyl acrylate, the acrylate of epoxidized oleic acid or ricinoleic acid, as well as the corresponding methacrylates of the above. The preferred monofunctional reactive solvents are acrylic acid and its esters; particularly those which have low volatility losses during cure.

The monofunctional reactive solvents serve two primary functions in the composition. They are the principal viscosity reducers; by selection and adjustment of the concentration of the specific monofunctional compounds used one can have some control over the viscosity of the final composition. Also, they contribute to the properties of the cured composition, such as hardness and flexibility.

The polyfunctional reactive solvents serve primarily to confer crosslink density to the cured composition so that it is rendered less soluble and less thermoplastic than the vinyl resin alone. These polyfunctional compounds contain at least two polymerizable

groups in the molecule. Proper selection of type and concentration permits control of certain physical properties of the cured composition, such as hardness, toughness, flexibility and solubility. In addition, proper selection of this component also permits control of the viscosity of the liquid composition before cure. Illustrative of suitable polyfunctional compounds one can mention the polyacrylate esters having from 2 to 6 acrylyl groups, such as, neopentyl glycol diacrylate, ethylene glycol diacrylate, propylene glycol diacrylate, diethylene glycol diacrylate, hexylene glycol diacrylate, trimethylolpropane triacrylate, pentaerythritol di-, or tri-, or tetra-acrylate or mixtures thereof, acrylated fatty acid and fatty oil epoxides such as acrylated linseed oil or soybean oil or tall oil or linoleic acid or linolenic acid or eleostearic acid or arachidonic acid, as well as the corresponding methacrylates of the above, as well as other polyfunctional acrylate compounds known to those skilled in the art. The preferred polyfunctional compounds are the polyacrylate esters. However, also useful are such polyfunctional compounds as vinyl acrylate, vinyl methacrylate, divinyl ketone, divinyl ether, divinyl sulfide, triallyl cyanurate, and the like. Polyfunctional reactive solvents are well known to those skilled in the polymer art and such individual, in view of the disclosure herein, has a full and clear understanding of the suitable compounds, other than those specifically identified, that can be used. While any polyfunctional reactive solvent capable of undergoing cure by radiation can be used, the preferred compounds are the acrylates and methacrylates, with the acrylates more preferred because of their generally faster cure rates and, their generally more desirable effects on the liquid coating compositions and the finished cured compositions.

The radiation curable compositions of this invention contain from about 5 to 70 weight percent, preferably from 15 to 35 weight percent, of the low molecular weight vinyl vinyl resin; from 0 to 60 weight percent, preferably from 0 to 40 weight percent, of the monofunctional reactive solvent; and from 10 to 70 weight percent, preferably from 10 to 50 weight percent, of the polyfunctional reactive solvent. It has been observed that larger quantities of the vinyl resin can be added as the molecular weight thereof is decreased (lower inherent viscosity) without affecting the viscosity of the composition. Thus, concentrations as high as about 70 weight percent of vinyl resins having inherent viscosities of about 0.07 have been used and applicable compositions have resulted. On the other hand, little success has been achieved in obtaining low viscosity solutions at such concentrations when the vinyl resins had inherent viscosities above about 0.2. Thus, the concentration of the vinyl resin in the composition is inversely related to its inherent viscosity when compositions with viscosities low enough to allow commercial application are desired.

The compositions are applied by conventional coating and printing methods known to those skilled in the art and they can be cured by the known radiation curing methods such as electron beam or ultraviolet light radiation. As previously indicated, a photoinitiator is generally required when ultraviolet light radiation is used. The particular photoinitiator to be used and the concentration thereof will vary with the specific coating composition if one is to obtain optimum results; it is generally present at a concentration of from about 0.5 to 10 weight percent. Any of the known photoinitiators can be used and illustrative thereof one can mention benzophenone, benzoin, acetophenone, benzoin methyl ether, Michler's ketone, benzoin butyl ether, thioxanthone, propiophenone, xanthone, fluorenone, carbazole, diethoxyacetophenone, the 2- or 3- or 4-methylacetophenones or methoxyacetophenones, the 2- or 3-chloroxanthones or chlorothioxanthones, 2-acetyl-4-methylphenyl acetate, 2,2'-dimethoxy-2-phenylacetophenone. These can be used alone, in admixture or in the presence of activators such as amine compounds. Illustrative thereof are, for example, diethanolamine, triethylamine, triphenylamine, tri-2-chloroethylamine, triethanolamine, 2-methylpyridine, piperazine, morpholine. Curing can be with conventional low, medium or high pressure mercury lamps or with a swirl-flow plasma arc radiation source by the process disclosed in U.S. Pat. No. 3,650,669. Cure can be carried out in air or under an inert gas atmosphere e.g., argon, nitrogen. The time for cure will vary depending upon the particular energy source used, the composition of the coating, the thickness of the film and the surrounding atmosphere conditions. The equipment used in the cure and the conditions under which cure can be conducted are well known to those skilled in the art of radiation technology. Likewise, the time periods required are well known to those skilled in the art and do not require further elucidation.

The cured films were evaluated by the procedures described in H. A. Gardner and G. G. Sward, *Physical and Chemical Examination of Paints, Varnishes, Lacquers and Colors*, 11th Edition, Gardner Laboratory, Bethesda, Maryland, 1950:

Abrasion Resistance — milligrams of coating removed per designated number of cycles with CS-17 wheels bearing 1000 gram weights; pp. 181–3.

Sward Hardness — compared to glass at 100; pp. 164–6.

Impact Resistance — falling tube impact device; pp. 173–5.

Adhesion was measured by percentage of film remaining after a Scotch (MMM No. 610) tape pull on a grid of razor blade cuts, 10 in each direction, ⅛ inch apart.

Stain resistance was measured by placing several drops of the staining liquid on the coating and covering the liquid with a small inverted dish. After the designated period, the liquid was wiped away with a wet towel and the imparted stain was estimated on a sale of 1–10 with 10 being "no stain" and 1 being "severe stain."

Acetone resistance, a measure of through-cure, was determined by placing a small swatch of cotton or paper saturated with acetone on the cured film (on a metal substrate), then measuring the time required (in seconds) for the film to be lifted off the substrate. The cotton is kept saturated with acetone during the test.

The inherent viscosities were determined at 30°C. using a solution of 0.2 gram of the resin in 100 ml. of cyclohexanone.

In the following examples parts are by weight unless otherwise specified.

EXAMPLE 1

A polymerization reactor was charged with 232 grams of vinyl chloride, 216 grams of vinyl acetate, 32 grams of 2-hydroxypropyl acrylate, 1,108 grams of acetone and a solution of 0.9 gram of isopropylperoxydicarbonate in 12 grams of acetone as the catalyst. The polymerization was carried out over a period of about 25 hours at a temperature of about 73°C. and a pressure of from 41 to 69 psig. During this period there was added, during the first 4 hours, a mixture of 467 grams of vinyl chloride, 170 grams of vinyl acetate and 213 grams of 2-hydroxypropyl acrylate. During the next 21 hours, a mixture of 4,035 grams of vinyl chloride, 2,265 grams of vinyl acetate, 1,345 grams of 2-hydroxypropyl acrylate and 6,500 grams of acetone was added to the polymerization reactor while simultaneously removing reaction mixture at a rate to keep the volume in the reactor substantially constant. Further, an additional quantity of 33 grams of the catalyst in 410 grams of acetone was added during the entire polymerization. At the end of the polymerization reaction the contents of the reactor were combined with the product recovered during the reaction; the total solids in the varnish was 33%. A small portion of the reaction product was precipitated by adding isopropanol and water to the varnish. The terpolymer was filtered, washed and dried. This dried vinyl terpolymer had an inherent viscosity of 0.222.

A coating composition was prepared by adding 100 parts of the vinyl terpolymer solution prepared above to 67 parts of neopentyl glycol diacrylate and then removing unreacted vinyl chloride and vinyl acetate, and acetone, under vacuum. To this composition there was added 2 weight percent of benzophenone and 3 weight percent of methyldiethanolamine as the photoinitiator. This composition was identified as Composition A.

A similar composition, Composition B, was prepared using 2 weight percent of n-butyl ether benzoin as the photoinitiator. The compositions were coated on birch plywood and their properties evaluated. The coatings were applied by sanding the wood, applying a 1 mil coating of the composition and curing as shown below, sanding the coating, and applying a top coat of the same material using a No. 20 wire wound rod. Composition A was cured in air by exposure to a 4.4 kw. mercury arc radiation source for 20 seconds. Composition B was cured by initially purging with nitrogen for 40 seconds and then curing under nitrogen by exposure to the same radiation source for 12 seconds. The cured coatings had the following properties:

|  | A | B |
| --- | --- | --- |
| Sward Hardness (Glass = 100) | 14–18 | 14–16 |
| 60° Gardner Gloss | 77–80 | 88–90 |
| Taber Wear Factor[a] | 8.2 | 5.4 |
| Crosshatch (intercoat) adhesion (%) | 85 | 40 |
| Resistance to: | | |
| Nail polish remover | 9 | 9 |
| Shaeffer's No. 32 Ink | 10 | 10 |
| 3% Aqueous ammonia | 10 | 10 |
| Mercurochrome | 10 | 10 |
| "Magic" Bleach | 10 | 10 |

[a]CS-17 Wheels, 1000 gram weights, 200 cycles, reported as milligrams weight loss per hundred cycles.

EXAMPLE 2

Following the procedure described in Example 1, a low molecular weight vinyl chloride, vinyl acetate, maleic acid polymer was produced. The initial charge to the autoclave contained 305 grams of vinyl chloride, 103 grams of vinyl acetate, 8 grams of maleic acid, 872 grams of acetone and a solution of 1.3 grams of isopropylperoxydicarbonate in 12 grams of acetone. The polymerization was carried out over a period of about 23 hours at a temperature of about 73°C. and a pressure of about 80 psig.

During the first 4½ hours, two separate feed streams were added simultaneously to the reactor. The first stream contained 765 grams of vinyl chloride and 135 grams of vinyl acetate, the second stream contained 55 grams of maleic acid and about 220 grams of acetone. During the balance of the reaction period, another stream containing 3,800 grams of vinyl chloride, 465 grams of vinyl acetate, 155 grams of maleic acid and 2,915 grams of acetone was added to the reactor while simultaneously removing reaction product at such rate as to keep the volume in the reactor substantially constant. Throughout the entire polymerization, an additional quantity of 45 grams of a catalyst in 405 grams of acetone was added. At the end of the polymerization reaction, the contents of the autoclave were combined with the product recovered during the reaction. A portion of the dried resin had an inherent viscosity of 0.18.

A coating composition was prepared by dissolving 30 parts of the above resin in a mixture of 10 parts of 2-ethylhexyl acrylate, 20 parts of neopentyl glycol diacrylate, 40 parts of phenoxyethyl acrylate and 2 parts of a 1:1 blend of the n- and iso-butyl ethers of benzoin as photoinitiator (Composition A). A similar coating composition was prepared in which the amounts of the reactants were 30/10/30/30, respectively (Composition B). The two coating compositions were applied to Bonderized No. 37 steel panels using a No. 10 wire wound rod. The coated panels were cured by exposure to a 15 kw. argon swirl-flow plasma arc radiation source under an inert atmosphere for 0.6 second and also exposed for 2.4 seconds. The cured coatings had the following properties:

| Composition | A | | B | |
| --- | --- | --- | --- | --- |
| Cure Time, sec. | 0.6 | 2.4 | 0.6 | 2.4 |
| Sward Hardness | 32 | 42 | 12 | 60 |
| Pencil Hardness | H | 2H | H | 2H |
| Crosshatch Adhesion, % | 100————————————————→ | | | |
| Impact, Face | >165————————————————→70 | | | |
| Reverse | >165————————————————→10 | | | |
| Acetone Resistance | 4 | 5 | 9 | 20 |

EXAMPLE 3

A low molecular weight vinyl chloride, vinyl acetate, acrylic acid polymer was produced in a manner similar to that described in Example 1. The polymerization reactor was charged with 384 grams of vinyl chloride, 120 grams of vinyl acetate, 8 grams of acrylic acid, 1,066 grams of acetone and a solution of 3 grams of isopropylperoxydicarbonate in 27 grams of acetone. The first feed stream was added over a period of 5 hours and consisted of 680 grams of vinyl chloride, 109 grams of vinyl acetate and 61 grams of acrylic acid. During the next 40 hours a mixture of 8,790 grams of vinyl chloride, 1,935 grams of vinyl acetate, 550 grams of acrylic acid and 9,100 grams of acetone was added while simultaneously removing reaction product so as to keep a constant volume in the reactor. The polymerization was carried out at a temperature of about 73°C. and a pressure of 50 to 93 psig. During the polymerization reaction, an additional quantity of 70 grams of isopropylperoxydicarbonate in 630 grams of acetone was added. At the end of the polymerization reaction, the contents of the autoclave were combined with the reaction product recovered during the polymerization. The dried low molecular weight polymer had an inherent viscosity of 0.24. Compositions A and B, corresponding to those described in Example 2, were prepared and evaluated as therein described.

| Composition | A | | B | |
|---|---|---|---|---|
| Cure Time, sec. | 0.6 | 2.4 | 0.6 | 2.4 |
| Sward Hardness | 30 | 44 | 44 | 50 |
| Pencil Hardness | F | 2H | 2H | 2H |
| Crosshatch Adhesion, % | 100———————————————→ | | | |
| Impact, Face | >165———————————————→70 | | | |
| Reverse | >165 | 120 | >165 | 40 |
| Acetone Resitance | 4 | 5 | 10 | 16 |

EXAMPLE 4

In a manner similar to that described in Example 1, a low molecular weight vinyl polymer was produced at a temperature of about 73°C. and a pressure of from 50 to 82 psig. The initial charge to the reactor consisted of 363 grams of vinyl chloride, 62 grams of vinyl acetate, 6.4 grams of glycidyl methacrylate, 1,150 grams of acetone and a solution of 1.7 grams of isopropylperoxydicarbonate in 15 grams of acetone. During the first 5½ hours of the polymerization reaction, a mixture of 680 grams of vinyl chloride, 49 grams of vinyl acetate and 121 grams of glycidyl methacrylate was added. Over the next 22.5 hours a mixture of 2,945 grams of vinyl chloride, 350 grams of vinyl acetate, 335 grams of glycidyl methacrylate and 3,350 grams of acetone was added while simultaneously removing reaction product at a rate to maintain a substantially constant volume in the reactor. Throughout the entire polymerization reaction, an additional quantity of 70 grams of the catalyst in 630 grams of acetone was added. At the end of the polymerization reaction, the contents of the autoclave were combined with the product recovered during the reaction. The dried vinyl resin had an inherent viscosity of 0.135.

Compositions A and B were produced, corresponding to those set forth in Example 2, and evaluated in the same manner. The cured coatings had the following properties:

| Composition | A | | B | |
|---|---|---|---|---|
| Cure Time, sec. | 0.6 | 2.4 | 0.6 | 2.4 |
| Sward Hardness | 22 | 40 | 36 | 50 |
| Pencil Hardness | B | 2H | 2H | 2H |
| Crosshatch Adhesion, % | 100———————————————→ | | | |
| Impact, Face | 65 | 20 | 45 | 10 |
| Reverse | >165 | F5 | 15 | F5 |
| Acetone Resistance | 4 | 7 | 6 | 11 |

EXAMPLE 5

Following the procedure described in Example 1, a low molecular weight vinyl resin was produced at a temperature of about 74°C. and a pressure of from 33 to 68 psig. The reactor was initially charged with 150 grams of vinyl chloride, 300 grams of vinyl acetate, 1,035 grams of acetone and a solution of 1.7 grams of isopropylperoxydicarbonate in 15 grams of acetone. The first feed was added to the reactor over a period of about 4 hours and consisted of 480 grams of vinyl chloride and 445 grams of vinyl acetate. The second feed was added over a period of about 23 hours and consisted of 1,610 grams of vinyl chloride, 1,790 grams of vinyl acetate, and 2,780 grams of acetone. During the addition of the second feed, reaction product was removed from the reactor so as to maintain a substantially constant volume therein. Throughout the entire polymerization reaction, an additional quantity of 55 grams of catalyst in 495 grams of acetone was added. At the end of the polymerization reaction, the contents of the reactor were combined with the product recovered during the reaction. The low molecular weight vinyl resin produced had an inherent viscosity of 0.126.

Compositions A and B, corresponding to those set forth in Example 2, were prepared and evaluated. The cured coatings had the following properties:

| Composition | A | | B | |
|---|---|---|---|---|
| Cure Time, sec. | 0.6 | 2.4 | 0.6 | 2.4 |
| Sward Hardness | 20 | 42 | 32 | 38 |
| Pencil Hardness | B | 2H | F | B |
| Crosshatch Adhesion, % | 100 | 100 | 100 | 30 |
| Impact, Face | 75 | 25 | 30 | 85 |
| Reverse | >165 | F5 | 15 | F5 |
| Acetone Resistance | 9 | 50 | 5 | 60 |

EXAMPLE 6

A low molecular weight vinyl polymer was produced in a procedure similar to that described in Example 1. The initial charge to the autoclave consisted of 120 grams of vinyl chloride, 240 grams of vinyl acetate, 1,125 grams of acetone and a solution of 2.6 grams of isopropylperoxydicarbonate in 15 grams of acetone. Over a period of about 3½ hours an initial feed mixture of 480 grams of vinyl chloride and 445 grams of vinyl acetate was added. This was followed, over a period of about 23 hours by a mixture of 825 grams of vinyl chloride, 925 grams of vinyl acetate and 1,680 grams of acetone. While simultaneously removing reaction product so as to maintain a substantially constant volume in the reactor. Throughout the polymerization an additional quantity of 80 grams of the catalyst in 450 grams of acetone was added, as required. The polymerization was carried out at a temperature of about 80°C. and a pressure of about 42 to 96 psig. At the end of the polymerization reaction, the contents of the reactor were combined with the product recovered during the reaction. The solution was slowly poured into cold methanol at a temperature of −20°C. to precipitate the polymer. The polymer was recovered, redissolved in acetone and reprecipitated in cold methanol at −20°C. The precipitated resin was recovered by decantation, washed with a 50:50 methanol:ice mixture, decanted and the wash was repeated. The polymer was given a final wash with cold water and then dried in an air oven at 35°C. The dried polymer had an inherent viscosity of 0.106.

Two compositions, A and B, were prepared similar to those described in Example 2 and then evaluated in the same manner. The cured coatings had the following properties:

| Composition | A | | B | |
|---|---|---|---|---|
| Cure Time, Sec. | 0.6 | 2.4 | 0.6 | 2.4 |
| Sward Hardness | 26 | 46 | 42 | 48 |
| Pencil Hardness | H | H | H | 2H |
| Crosshatch Adhesion, % | 100 —————————————→ | | | |
| Impact, Face | 75 | 40 | 60 | 30 |
| Acetone Resistance | 15 —————————————→ | | | |

EXAMPLE 7

Following the procedure described in Example 1, a low molecular weight vinyl resin was produced at a temperature of about 80°C. and a pressure of from 35 to 50 psig. The initial charge to the reactor consisted of 144 grams of vinyl chloride, 256 grams of vinyl acetate, 948 grams of acetone, 240 grams of anhydrous isopropyl alcohol and a solution of 1.3 grams of benzoyl peroxide in 12 grams of acetone. Over a period of about 4¾ hours a mixture of 105 grams of vinyl chloride and 98 grams of vinyl acetate was added. The reaction was stopped over night and the following morning it was reheated and over a period of 8 hours another 128 grams of vinyl chloride and 119 grams of vinyl acetate were added. During the addition of the monomers mixtures an additional quantity of 31 grams of the catalyst in 280 grams of acetone was added. At the completion of the reaction the contents of the reactor were cooled and slowly poured into cold methanol at −50°C. The polymer was washed in a manner similar to that in Example 5 and then dried. The dried polymer had an inherent viscosity of 0.091.

Compositions A and B, corresponding to those described in Example 2, were prepared and evaluated as described therein. The cured coatings had the following properties:

| Composition | A | | B | |
|---|---|---|---|---|
| Cure Time, sec. | 0.6 | 2.4 | 0.6 | 2.4 |
| Sward Hardness | 10 | 38 | 28 | 50 |
| Pencil Hardness | 2H | 2H | 2H | 3H |
| Crosshatch Adhesion, % | 100 —————————————→ | | | |
| Impact, Face | 70 | 60 | 50 | 25 |
| Reverse | 30 | 15 | <5 | <5 |
| Acetone Resistance | 15 | 15 | 12 | 14 |

EXAMPLE 8

In a manner similar to that described in Example 1, a low molecular weight vinyl polymer was produced by initially charging to the polymerization reactor 144 grams of vinyl chloride, 256 grams of vinyl acetate, 785 grams of acetone, 400 grams of anhydrous isopropanol and a solution of 2.7 grams of isopropylperoxydicarbonate in 15 grams of acetone. At a temperature of about 80°C. and a pressure of about 47 to 82 psig., a mixture of 365 grams of vinyl chloride and 338 grams of vinyl acetate was added to the reactor over a period of about 3.75 hours. During this addition, a quantity of 12 grams of the catalyst in 68 grams of acetone was added. After cooling, the polymer was precipitated by slowly pouring it into methanol at −40°C. The polymer was collected, washed with a 50:50 mixture of methanol and ice and then twice with ice water. It was air dried and had an inherent viscosity of 0.08.

Compositions A and B, equivalent to those described in Example 2, were prepared and evaluated. The cured coatings had the following properties:

| Composition | A | | B | |
|---|---|---|---|---|
| Cure Time, sec. | 0.6 | 2.4 | 0.6 | 2.4 |
| Sward Hardness | 10 | 38 | 28 | 54 |
| Pencil Hardness | HB | 2H | H | 2H |
| Crosshatch Adhesion, % | 90 | 100 | 90 | 100 |
| Impact, Face | 60 | 40 | 40 | 15 |
| Reverse | 100 | 5 | 85 | F5 |
| Acetone Resistance | 12 | 14 | 15 | 16 |

EXAMPLE 9

In a manner similar to that described in Example 1, a low molecular weight vinyl polymer was produced at a temperature of about 80°C. and a pressure of from about 46 to 74 psig. The initial charge to the reactor consisted of 136 grams of vinyl chloride, 216 grams of vinyl acetate, 610 grams of acetone, 622 grams of isopropyl alcohol and a solution of 2.1 grams of isopropylperoxydicarbonate in 12 grams of acetone. Over a period of about 6 hours a mixture of 312 grams of vinyl chloride and 276 grams of vinyl acetate was added to the reactor while simultaneously adding a solution of 28 grams of catalyst in 159 grams of acetone. At the completion of the reaction, the cooled varnish was slowly added to isopropyl alcohol at −30°C. The precipitated resin was redissolved in acetone and reprecipitated by adding the solution to isopropanol at −50°C., decanted and the resin washed with isopropanol/ice water mixture and then twice with ice water to yield a fine particle product which was further dried in a vacuum oven. The polymer had an inherent viscosity of 0.074.

Compositions A and B were prepared as described in Example 2. The cured coatings had the following properties:

| Composition | A | | B | |
|---|---|---|---|---|
| Cure Time, sec. | 0.6 | 2.4 | 0.6 | 2.4 |
| Sward Hardness | 4 | 32 | 12 | 38 |
| Pencil Hardness | H | H | H | H |
| Crosshatch Adhesion, % | 100 —————————————→ | | | |
| Impact, Face | >165 | 150 | 80 | 30 |
| Reverse | >165 | 145 | 35 | F5 |
| Acetone Resistance | >300 | 78 | 25 | 25 |

EXAMPLE 10

Following the procedure described in Example 1, a low molecular weight vinyl acetate homopolymer was prepared by polymerizing vinyl acetate at 68°C. at a pressure of 30 to 45 psig. The initial charge to the reactor was 560 grams of vinyl acetate, 1,040 grams of acetone and a solution of 0.6 gram of isopropylperoxydicarbonate in 12 grams of acetone. Over a 3.5 hour period, 900 grams of vinyl acetate were added. Then over a period of 22 hours a solution of 7,200 grams of vinyl acetate in 5,200 grams of acetone was added. At the end of the reaction the polymer was recovered by evaporating the solvent and unreacted monomer in a vacuum oven. The dried polymer had an inherent viscosity of 0.138.

A composition was prepared containing 25 parts of the dried poly(vinyl acetate), 40 parts of neopentyl glycol diacrylate, 35 parts of isobutyl acrylate and 2 parts of n-butyl ether benzoin, Composition A. A second composition, Composition B, was prepared in which quantities of the components were 20 parts of the poly(vinyl acetate), 20 parts of neopentyl glycol diacrylate, 10 parts of 2-ethylhexyl acrylate, 50 parts of (methylcarbamyl)ethyl acrylate and 2 parts of n-butyl ether benzoin. The compositions were coated on steel plates as described in Example 2 and cured by exposure to the plasma arc radiation source for 2.4 seconds. The cured coatings had the following properties:

| Composition | A | B |
| --- | --- | --- |
| Sward Hardness | 30 | 28 |
| Pencil Hardness | H | H |
| Crosshatch Adhesion, % | 100 | 100 |
| Impact, Face | 40 | 60 |
| Reverse | F5 | >165 |
| Acetone Resistance | >300 | 6 |

What is claimed is:

1. A radiation curable composition consisting essentially of (A) from 5 to 70 weight percent of a low molecular weight vinyl acetate polymer, said polymer containing from 5 to 100 mole percent vinyl acetate polymerized therein and having an inherent viscosity of below 0.25 as determined at 30°C. using a solution of 0.2 gram of resin per 100 ml. of cyclohexane, (B) from 10 to 70 weight percent of a polyfunctional reactive compound containing at least two radiation curable polymerizable $$>C=C<$$

groups in the molecule, and (C) from 0 to 60 weight percent of a monofunctional reactive compound containing a radiation curable polymerizable $$>C=C<$$

group in the molecule.

2. A radiation curable composition as claimed in claim 1, wherein component (A) is present at a concentration of from 15 to 35 weight percent.

3. A radiation curable composition as claimed in claim 1, wherein component (B) is present at a concentration of from 10 to 50 weight percent.

4. A radiation curable composition as claimed in claim 1, wherein component (C) is present at a concentration of from 0 to 40 weight percent.

5. A radiation curable composition as claimed in claim 1, wherein component (A) is present at a concentration of from 15 to 35 weight percent, component (B) is present at a concentration of from 10 to 50 weight percent, and component (C) is present at a concentration of from 0 to 40 weight percent.

6. A radiation curable composition as claimed in claim 1, wherein the low molecular weight vinyl acetate polymer has an inherent viscosity of from 0.05 to 0.15.

7. A radiation curable composition as claimed in claim 5, wherein the low molecular weight vinyl acetate polymer has an inherent viscosity of from 0.05 to 0.15.

8. A radiation curable composition as claimed in claim 1, wherein component (B) is a polyacrylate ester having from 2 to 6 acrylyl groups.

9. A radiation curable composition as claimed in claim 5, wherein component (B) is a polyacrylate ester having from 2 to 6 acrylyl groups.

10. A radiation curable composition as claimed in claim 1, wherein component (C) is acrylic acid or its esters.

11. A radiation curable composition as claimed in claim 5, wherein component (C) is acrylic acid or its esters.

12. A radiation curable composition as claimed in claim 1, wherein the low molecular weight vinyl acetate polymer is poly(vinyl acetate).

13. A radiation curable composition as claimed in claim 5, wherein the low molecular weight vinyl acetate polymer in poly(vinyl acetate).

14. A radiation curable composition as claimed in claim 1, wherein the low molecular weight vinyl acetate polymer is a copolymer of vinyl acetate and vinyl chloride.

15. A radiation curable composition as claimed in claim 5, wherein the low molecular weight vinyl acetate polymer is a copolymer of vinyl acetate and vinyl chloride.

16. A radiation curable composition as claimed in claim 1, wherein the low molecular weight vinyl acetate polymer is a polymer of vinyl acetate, vinyl chloride and one or more polymerizable ethylenically unsaturated monomers containing the polymerizable $$>C=C<$$

group.

17. A radiation curable composition as claimed in claim 5, wherein the low molecular weight vinyl acetate polymer is a polymer of vinyl acetate, vinyl chloride and one or more polymerizable ethylenically unsaturated monomers containing the polymerizable $$>C=C<$$

group.

18. A radiation curable composition as claimed in claim 1, wherein component (A) is a terpolymer of vinyl acetate, vinyl chloride and 2-hydroxypropyl acrylate and component (B) is neopentyl glycol diacrylate.

19. A radiation curable composition as claimed in claim 1, wherein component (A) is a terpolymer of vinyl acetate, vinyl chloride and maleic acid, component (B) is neopentyl glycol diacrylate, and component (C) is a mixture of 2-ethylhexyl acrylate and phenoxyethyl acrylate.

20. A radiation curable composition as claimed in claim 1, wherein component (A) is a terpolymer of vinyl acetate, vinyl chloride and glycidyl acrylate, component (B) is neopentyl glycol diacrylate, and component (C) is a mixture of 2-ethylhexyl acrylate and phenoxyethyl acrylate.

21. A radiation curable composition as claimed in claim 1, wherein component (A) is a copolymer of vinyl acetate and vinyl chloride, component (B) is neopentyl glycol diacrylate, and component (C) is a mixture of 2-ethylhexyl acrylate and phenoxyethyl acrylate.

22. A radiation curable composition as claimed in claim 1, wherein component (A) is poly(vinyl acetate), component (B) is neopentyl glycol diacrylate, and component (C) is isobutyl acrylate.

23. A radiation curable composition as claimed in claim 1, wherein component (A) is poly(vinyl acetate), component (B) is neopentyl glycol diacrylate, and component (C) is a mixture of 2-ethylhexyl acrylate and (methylcarbamyl)ethyl acrylate.

* * * * *